March 23, 1971  G. TOCCI  3,572,184

TOOL FOR ADJUSTING TIE RODS

Filed Feb. 5, 1969

United States Patent Office 3,572,184
Patented Mar. 23, 1971

3,572,184
TOOL FOR ADJUSTING TIE RODS
George Tocci, 240 Floral Ave., Plainview, N.Y. 11803
Filed Feb. 5, 1969, Ser. No. 796,776
Int. Cl. B25b 1/00
U.S. Cl. 81—3    8 Claims

ABSTRACT OF THE DISCLOSURE

A tool for use in freeing and rotating threaded split sleeves of the type forming part of the adjustment means of a vehicular tie rod. The tool is in the form of a split nut, the two parts of which may be readily bolted around the split sleeve and is provided with an elongated wedge which forces the lips of the sleeve apart thereby freeing the sleeve for rotation.

---

This invention relates to a tool which is especially well suited for adjusting a vehicular tie rod, and more particularly to such a tool which is of relatively simple construction, is readily adaptable for use in adjusting tie rods of different diameter, and which makes possible direct, positive adjustment of the tie rod by means of a conventional open-end wrench.

Tie rods such as those which control the relative position of the steering wheels of an automobile usually comprise a pair of threaded bars joined by an internally threaded sleeve so that when the sleeve is turned in one direction the bars are drawn together, and when it is turned in the opposite direction the bars are spread apart. Customarily, the sleeve is slotted or split and is resilient to facilitate adjustment. Nevertheless, considerable difficulty is usually experienced in turning the sleeve so as to make the necessary adjustment. Frequently this results in the unnecessary replacement of parts and the cost incident thereto.

When a wrench of the convenional type is used on the sleeve, the force exerted to rotate the sleeve serves to compress the sleeve against the rods. To avoid this, spanner-type wrenches have been provided having a hook-like end which, in use, engages the slot of the split sleeve and tends to spread it apart. Such spanner-type tools have left much to be desired. For one thing, because of the adverse conditions to which the vehicular tie rod fittings are subjected in use, considerable force is required to free the split sleeve so that it can be rotated. And in order to develop the force required, the handle of the spanner wrench must be so long that rotation thereof through the required arc is impeded and sometimes prevented altogether by adjacent vehicle members.

It is therefore a principal object of my invention to provide an improved tool for use in freeing and rotating split sleeves of the type used in vehicle tie rod assemblies, which is in the form of a split nut formed with an internally projecting wedge that serves to spread the lips of the sleeve apart when the tool is assembled around the sleeve and clamped thereto.

Another object of this invention is to provide such a tool which in transverse cross section has the shape of a nut so that it can be readily engaged and rotated by any standard open-end wrench of the proper size.

Yet another object of my invention is to provide such a tool which is readily adapted to engage both large and small diameter sleeves.

Figure 1:
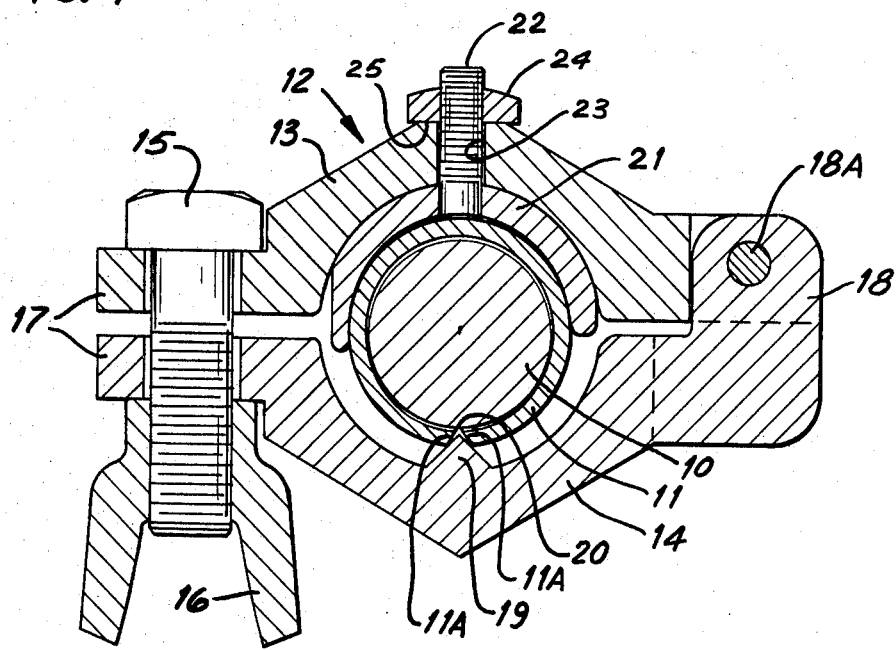
Figure 2:
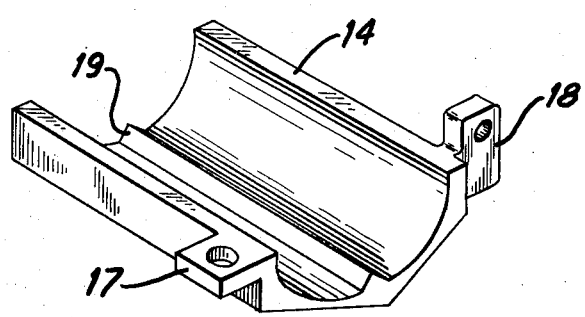

Further objects as well as advantages of my invention will be apparent from the following detailed description of a preferred embodiment thereof and the accompanying drawing in which FIG. 1 is a transvers cross-sectional view of a tool constructed in accordance with my invention in position clamped on the split sleeve of a tie rod assembly; and FIG. 2 is a perspective view of the tool open and partially broken away for convenience.

Turning now to the drawing, one of a pair of rods 10 forming a vehicular tie rod assembly is shown in FIG. 1 in threaded engagement in the usual way with a split sleeve 11 which also is in threaded engagement with the other rod of the pair. As is well known, the sleeve is internally threaded and the rods are externally threaded so that rotation of the sleeve 11 in one direction serves to draw the ends of the rods together within the sleeve and rotation of the sleeve in the opposite direction forces the rods apart. Adjustment of the tie rod assembly is made in the known way by rotating the sleeve 11 in the direction and to the extent required.

Tool 12 constructed in accordance with the present invention is shown (FIG. 1) in clamping engagement with the sleeve 11 and comprises mating clamping members 13 and 14 which are releasably clamped about the sleeve 11 by a bolt 15 and wing nut 16. For that purpose, the clamping members 13 and 14 are provided with aligned and bored ears 17 through which bolt 15 extends. On the side thereof opposite to ears 17, the clamping members 13 and 14, as shown, are pivotally connected by means of a hinge 18 and pin 18A.

The clamping member 14 is formed with a wedge-shaped projection 19 extending longitudinally therealong which is forced into slot 20 formed in sleeve 11 and serves to spread the edges or lips 11A of the sleeve apart when the tool 12 is clamped about the sleeve 11.

The external shape of tool 12, except for part of its length where interrupted by ears 17 and hinge 18, is preferably that of a regular hexagon, as shown, for engagement by a standard open-end wrench although any other desired shape for which standard wrenches are available may also be used. As is most clearly shown in FIG. 2, the overall length of the tool is such that the ears 17 and hinge 18 do not interfere in any way with the engagement of the tool by a wrench. The internal surfaces of the clamping members 13 and 14, except for the projection 19, are each substantially semi-cylindrical to facilitate clamping them around sleeve 11. When it is desired to clamp the tool 12 about a sleeve such as sleeve 11 having a diameter which is too small for the inner diameter of the members 13 and 14, then shimming means are used in the form of an arcuate insert 21 which may be semi-cylindrical as shown and having a stud 22 fixed thereto. The insert 21 is positioned with its stud 22 extending through a hole 23 formed in the clamping member 13 for that purpose and is held in place by means of a nut 24 which engages flat 25. The hole 23 and flat 25 are formed in alignment with the ears 17 and hinge 18 so that they and the stud 22 do not interfere with engaging the tool 12 with a wrench.

In use, the open tool 12 is slipped about a split or slotted sleeve, with or without the insert 21 in place depending upon the diameter of the sleeve and with the projection 19 aligned with or started in the slit 20. The bolt 15 is passed through the ears 17 and wing nut 16 is threaded on and tightened, thereby forcing the projection into the slit 20 and spreading the lips 11A apart. This spreading action effectively increases the internal diameter of the sleeve. And now when the tool 12 is rotated by means of a wrench, the sleeve is readily turned to precisely the position required to effect the needed adjustment. Because of its hexagonal exterior configuration, the wrench is readily shifted so as to avoid the obstructions normally present on most vehicles.

While the present invention has been described in connection with the preferred embodiment shown, it is to be noted that various modifications can be made therein. For example, the external configuration can have other shapes than hexagonal. For example, the tool can be four sided or any other non-circular shape and even circular if desired. Other connecting means than a bolt and wing nut on one side together with a hinge and hinge pin on the other side will suggest themselves to those skilled in the art. Therefore, the terms and expressions which have been employed are used as terms of description and not of limitation, and there is no intention, in the use of such terms and expressions, of excluding any equivalents of the features described or portions thereof, but it is recognized that various modifications are possible within the scope of the invention claimed.

What I claim is:

1. A tool adapted for engaging a slit sleeve of a vehicular tie rod assembly, comprising a pair of elongated clamping members each having one arcuate surface forming the inner surface thereof adapted to engage and extend substantially about one half of a split circular workpiece, the opposite outwardly presented surfaces of said clamping members each forming substantially half of a seat adapted to be engaged by the jaws of a wrench, one of said clamping members having an elongated projection extending along said one arcuate surface thereof for engagement in said slit when said clamping members are locked about said workpiece, and locking means for releasably interconnecting and clamping said clamping members about said workpiece with said projection engaged in said slit.

2. A tool as set forth in claim 1, comprising hinge means pivotally connecting said clamping members one to the other, said hinge means extending longitudinally along only a part of said clamping members.

3. A tool as set forth in claim 2, comprising a pair of apertured ears one extending from each of said clamping members on the side thereof opposite said hinge means, said ears extending in substantially aligned relation and with said apertures substantially in registration when said clamping members are closed on said hinge means to receive said locking means.

4. A tool as set forth in claim 3, said clamping members being adapted for engaging a workpiece having a predetermined minimum diameter and shimming means and means for removably mounting the same in juxtaposition with said one surface of one of said clamping members for adapting said clamping members for engagement with a workpiece having a diameter less than said predetermined diameter.

5. A tool as set forth in claim 4, said shimming means including an arcuate elongated member.

6. A tool as set forth in claim 5, said opposite surfaces of said clamping members forming a non-circular seat for a wrench.

7. A tool as set forth in claim 6, said hinge means, said ears, and said shim mounting means all being substantially aligned circumferentially about said tool adjacent to one end thereof, the remainder of said opposite surfaces together forming said seat, and said seat being non-circular.

8. A tool as set forth in claim 1 wherein said projection is wedge-shaped.

References Cited
UNITED STATES PATENTS

| | | | |
|---|---|---|---|
| 2,222,289 | 11/1940 | Fordon | 24—249 |
| 2,346,859 | 4/1944 | Mills | 24—249 |
| 3,104,461 | 9/1963 | Nieglos | 29—282 |

OTHELL M. SIMPSON, Primary Examiner